(12) United States Patent
Tooley

(10) Patent No.: US 11,906,084 B2
(45) Date of Patent: Feb. 20, 2024

(54) FLANGE LEVELING SYSTEM FOR SUPPORTING AND ALIGNING A FLANGE AND RELATED METHOD

(71) Applicant: Travis Tooley, Billings, MT (US)

(72) Inventor: Travis Tooley, Billings, MT (US)

(*) Notice: Subject to any disclaimer, the term of this patent is extended or adjusted under 35 U.S.C. 154(b) by 866 days.

(21) Appl. No.: 16/921,136

(22) Filed: Jul. 6, 2020

(65) Prior Publication Data

US 2022/0003343 A1    Jan. 6, 2022

(51) Int. Cl.
*F16L 23/00* (2006.01)
*B25B 27/16* (2006.01)
*G01C 9/28* (2006.01)
*B23K 37/053* (2006.01)

(52) U.S. Cl.
CPC ............ *F16L 23/003* (2013.01); *B25B 27/16* (2013.01); *G01C 9/28* (2013.01); *B23K 37/0536* (2013.01)

(58) Field of Classification Search
CPC ............ B23K 37/0533; B23K 37/0536; F16L 23/003; B25B 27/16; G01C 9/28
See application file for complete search history.

(56) References Cited

U.S. PATENT DOCUMENTS

| | | | |
|---|---|---|---|
| 2,352,290 A * | 6/1944 | Saul | B25B 27/16 |
| | | | 29/239 |
| 2,358,564 A | 9/1944 | Donaldson | |
| 2,746,163 A | 5/1956 | Moritz | |
| 3,762,068 A | 2/1973 | Clay | |
| 4,052,045 A | 10/1977 | Shaddix | |
| 4,195,828 A | 4/1980 | Peterson | |
| 4,335,523 A * | 6/1982 | Bryant | G01C 9/28 |
| | | | 33/371 |
| 4,662,055 A | 5/1987 | VanMeter | |
| 5,074,536 A | 12/1991 | McConkey | |
| 5,094,435 A | 3/1992 | Depperman | |
| 5,228,181 A | 7/1993 | Ingle | |
| 5,560,091 A | 10/1996 | Labit, Jr. | |
| 8,960,748 B2 | 2/2015 | Scott | |
| 9,827,636 B2 | 11/2017 | Tsui et al. | |
| 2016/0363245 A1 * | 12/2016 | Trujillo | F16L 23/003 |
| 2019/0001473 A1 * | 1/2019 | Harper | B25B 27/16 |

* cited by examiner

*Primary Examiner* — Seahee Hong
(74) *Attorney, Agent, or Firm* — Suzanne Kikel

(57) ABSTRACT

A pipe flange is leveled for welding by using stainless steel using ball bearings attached to a U-shaped spring-loaded wire so a fitter is able to level a flange for welding while the wire supports a level. The ball bearings are part of a first leveling unit and a second leveling unit which comprise a flange leveling system. The spring acts to bias a first leg and a second leg of the leveling units such that the distal ends of both legs are biased toward each other. The ball bearings are axially co-linear with each other and are sized to be seated in bolt holes defined in the first and second sides of the pipe flange. A related process is also disclosed wherein the flange is adjusted until the associated flange holes on the first and second sides of the pipe flange are level with each other.

5 Claims, 6 Drawing Sheets

FLANGE LEVELING SYSTEM FOR SUPPORTING AND ALIGNING A FLANGE AND RELATED METHOD

CROSS REFERENCE TO RELATED APPLICATIONS

This application claims priority to U.S. Provisional Patent Application Ser. No. 62/906,934 filed Sep. 27, 2019, the disclosure of which is incorporated herein by reference in its entirety.

BACKGROUND OF THE INVENTION

1. Field of the Invention

The present invention relates, in general, to a flange leveling system and related methods for supporting and aligning a flange relative to a stationary object where the flange is to be secured. More specifically, embodiments of the invention generally relate to a method and a system for supporting and aligning a pipe flange relative to another flange or a tubular member, such as a joint of a pipe in the vicinity of the pipe flange which is to be fastened, such as, for example, by welding.

2. Brief Description of the Prior Art

A flange is a ring-like structure or a collar that is attached to a pipe for the purpose of providing support when two or more pipes are connected together either by welding or by some other means, or for other purposes as the pipes are installed on site.

Individual lengths of pipe are generally joined together or are joined to other types of apparatuses by coupling thereto with similar apertured flanges at respective ends thereof, using bolts or the like. These flanges are normally welded or otherwise permanently affixed to the two ends of a length of pipe. Hence, ease of coupling together a plurality of aligned lengths of pipe requires that the bolt holes in the flanges of each pipe to be joined together be in alignment. However, the flanges are normally neither applied to the pipes in the field nor adjustable with respect to the pipes in the field. Hence, to assure alignment of the flange bolt holes from one length of pipe to the next, it is necessary that the flanges on each end of each length of pipe be attached thereto with their bolt holes in coaxial alignment. It will be appreciated that such alignment is also important when replacing a length of pipe in the field, as it permits ready alignment of the flanges at both ends of the replacement pipe with the respective flanges of the adjacent length of pipe to either side thereof.

The most widely used method of bolt hole alignment is commonly referred to as "true holing" or "two holing" of the flanges. This method of alignment involves first permanently attaching a flange to one end of the pipe, inserting bolts into two adjacent bolt holes, and rotating both pipe and flange until a small level device which is supported by the bolts indicates a level position. Thereafter, a loose flange is placed on the opposite end of the pipe and a pair of bolts is inserted into adjacent bolt holes of the second flange. The level device is then supported on these bolts, and the loose flange is rotated with the pipe remaining stationary until the level device again indicates a level position. The loose flange is then permanently attached to the pipe in that position, resulting in its bolt holes being substantially coaxially aligned with the bolt holes of the first flange at the opposite end of the pipe.

While the foregoing system of alignment has been widely used for many years, this system does not always result in perfect alignment and leaves some areas for improvement. For example, clearance between the bolts and bolt holes in a typical flange is sufficient to permit some tilting or cocking of each bolt with respect to its bolt hole. Oftentimes, workers will use even a smaller size of bolt for convenience in insertion through the bolt holes, resulting in even a greater potential for such tilting and cocking of the bolts. Hence, with the level device in the foregoing method of alignment being supported by such tilted or cocked bolts, there is no assurance that the "level" position obtained at one end of the pipe will be matched to the "level" position at the opposite end. That is, the amounts and directions of tilting or cocking of the bolts are unpredictable, and hence, cannot be assumed to be the same at both ends of the pipe when the preceding procedure is used. Once the preassembled pipe and their flanges are in the field, the resulting inaccuracies can cause delays and high labor costs in installation, repair and/or replacement of the pipe.

In the assembly and fitting of piping systems, it is often necessary to align opposing adjacent pipe flanges so that they can be connected by bolting or by other means. The alignment of adjacent flanges may be difficult and time consuming depending on the size of the pipe involved and the distance the opposing pipe flanges must be moved to achieve alignment.

Furthermore, in the fabrication and reworking of piping systems, it is often necessary to position the flanges relative to other objects to which the flanges are subsequently fastened. For example, a flange may be positioned to facilitate fastening with joints of a pipe, or with a tubing; or with pipe fittings, such as elbows, tees, or valves; or with another flange. The flange may be fastened to these various objects either by welding or by bolts, or the like, when the flange is properly positioned relative to the object. In the case of bolt-type flanges, proper positioning of the flange typically requires the bolt pattern of the to-be-installed flange to be coaxially aligned with the bolt pattern of the other flanges. Additionally, in the case of pipe flanges, the mating face of the flange should be substantially normal to the longitudinal axis of the pipe. The positioning of the bolt pattern and the leveling of the mating face of the to-be installed flange assures mating with other flanges on pipes, fittings, and/or valves when the piping system is installed.

Numerous methods and devices have been employed to facilitate positioning of the flanges. Conventional methods include supporting the flange from above or below the flange to be near the object where the flange is to be fastened. The flange is then manipulated by personnel to move the flange into position using one's body strength and/or various hand tools, such as bars, wrenches, lifting devices, and/or alignment pins. While this method may be suitable for smaller flanges, for example, flanges weighing less than 50 pounds, this method can be hazardous when positioning larger flanges. The conventional methods are also time consuming and are even more hazardous when performed in a confined space.

Thus, there is a need in the art for a method and apparatus for supporting and aligning flanges.

Currently in the field, different size flanges require different fixtures to set up for pipe-flange welding. Some specially designed "Flange Mounting Plates" fit a number of flange sizes and pipe sizes, but the range is relatively small. Consequently, several flange mounting plates with varying sizes are required to cover most of the commonly used flanges.

There is also another type of "Flange Clamping Plate" which requires as many as five (5) different sizes to make it useful across the full spectrum of the common flange sizes ranging from 4 to 24 holes. As such, there is a high level of unwieldiness at job sites performing flange/pipe welding task, due to the limited capacity and flexibility of the tool or fixture for such purpose.

Additionally, some Flange Mounting Plates currently used in the field may cause some unnecessary end play between the mounting studs and the screw holes of the flange, due to the off-alignment of the studs in view of the weight of the flange at the time of working.

Thus, there is a further need in the art for a method and apparatus which eliminates the end play issue by aligning the centers of the flange to the center of the pipe by relying on the center hole of the "Flange Mounting Plate". However, all of the flanges known to the inventor are often cumbersome to align and mount. Accordingly, there is need in the art for a means to permit expeditious aligning of a flange.

Efforts have been made to provide tools to facilitate pipe flange alignment. One such device is that disclosed in U.S. Pat. No. 4,662,055 to Van Meter. Van Meter describes a flange alignment tool and method for aligning flanges at opposite ends of a length of pipe. The tool is comprised of a body portion having a flat surface for abutting the pipe flange rear surface, a curvilinear surface for engagement with the neck portion of the pipe flange, and alignment pins which fit through adjacent bolt holes in the pipe flange. Resilient springs urge the alignment pins in a predetermined direction against the pipe flange bolt holes.

Another prior art device is disclosed in U.S. Pat. No. 5,228,181 to Ingle. Ingle discloses a device for aligning opposing adjacent first and second pipe flanges. The device is comprised of an elongated body having jacking screws at each end, a carriage which can be positioned along the body, and a tie plate for attaching the carriage to the first of the opposing pipe flanges by means of studs for insertion into the pre-existing pipe flange bolt holes.

Alignment is achieved with the Ingle device by positioning the carriage along the elongated body so that one of the jacking screws is at the second of the opposing flanges and the other is at a point on the pipe opposite the first opposing flange, and then turning the jacking screws to force the first and second pipe flanges into alignment. Ingle contains many parts which are positioned together and the user must maintain and keep track of many different tie-plates to use the device on different pipes with differing diameters and flange sizes.

A still further device for obtaining flange alignment is disclosed in U.S. Pat. No. 5,074,536 to McConkey. McConkey discloses a device to precisely align large diameter, flanged pipe sections which are comprised of an elongated central bolt having tapered mandrels at either end. Sleeve sections fit over the central bolt and mandrels which expand outwardly thereby increasing the diameter of the device as the bolt is tightened.

In use, the device of McConkey is inserted into adjacent bolt openings of corresponding pipe flanges, the head of the bolt is turned expanding the diameter of the tool and forcing the bolt holes into a precise alignment so that standard fastening bolt assemblies may be used to secure the flanges together. A disadvantage of the McConkey device is that it is a precision alignment tool only and cannot be used unless the adjacent bolt holes are already substantially in alignment since the device must fit through the bolt holes of each flange.

A device used to clamp and align pipe tube sections for welding is disclosed in U.S. Pat. No. 4,195,828 to Peterson. The Peterson apparatus is comprised of a U-shaped bracket for caging the end of one of two adjacent tube sections and an opposing offset portion extending away from the caging bracket, the offset portion has an adjustable screw shaft member for moving the other adjacent pipe tube into alignment with the caged tube end for welding.

Another method and apparatus for clamping and concentric alignment of a pipe flange to a pipe for permanent attachment by welding is disclosed in U.S. Pat. No. 5,094,435 to Depperman, et al. This clamping and alignment device is comprised of C-shaped frame having opposing end sections and a transverse section which is clamped to a bolt hole on the pipe flange and an elongated base portion which extends out over the pipe. The opposing end sections of the C-shaped frame are aligned with the bolt hole with alignment screws. The elongated base portion also has an alignment screw to engage the outer surface of the pipe to move the pipe for concentric alignment with the flange.

In another well-known apparatus for supporting and aligning a pipe flange relative to another flange, a flange pin is employed. The flange pin has a threaded cylindrical body with two machined heads threadably attached thereto. The heads are frustoconical with the frustum being adapted to be accommodated in a flange hole. The flange pins are located on opposite sides of a flange and are brought into contact with the flange adjacent to the flange holes. The heads also have a cylindrical surface which is located adjacent to the flange. Once the flange pins are tightened against the flange, a level device is placed on the cylindrical surfaces of two adjacent flange pins to determine the degree of levelness of the flange located between the two flange holes. Once the flange holes are level, the pipe associated with the flange is placed. Theoretically, if the corresponding flange holes in the flanges on opposite ends of a pipe are both level then the pipe will lie straight and true on the desired path.

While the means and method described in the preceding paragraph has been popular, it has several drawbacks, such as: (1) the cylindrical surface on which the level device rests is prone to distortion due to damage from dropping, impact with other objects, and deposits of solder; (2) the threaded body is subject to damage and distortion for the same reasons; (3) the hole defined in the flange may be distorted causing inaccurate and/or imprecise seating of the flange pin; and/or (4) the frustum portion of the head is subject to distortion for the same reasons as stated above. While any of these defects may seem small, if the flange is only very slightly out of plumb, any error is magnified due to the long distance between flanges on each end of a pipe. For any or all of the aforesaid reasons, the use of flange pins has proven to have drawbacks.

Furthermore, the cylindrical shape of the flange pin head has a finite surface area on which a level device rests. Such finite surface is subject to distortion from any of the above-mentioned causes. In fact, any defect in the surface of the level which rests on the flange pin head may also be subject to distortion. These distortions can create inaccuracies and imprecision in the flange alignment process. As discussed above, even a slight inaccuracy is multiplied over the length of the pipe.

Still further, the flange pins are somewhat cumbersome to use. At least one of the heads must be removed from the threaded body before the body can be inserted through the flange hole. This step may appear easy, but can be difficult in cold weather, especially if the user is wearing heavy gloves. This step may be difficult if the location of the flange is inconvenient. Still further, placing a head onto the threaded body and then removing it may cause the head to be dropped, thereby damaging it. The more parts that have to be separated and replaced, the likelier it is that a part is dropped, lost or damaged.

Even though some prior art flange pins have built-in levels, these levels are often nearly useless. There is, therefore, a further need in the art to provide an improved pipe flange alignment technique and a device to align adjacent flanges of opposing pipe sections for attachment by bolting or other means.

SUMMARY OF THE INVENTION

The present invention meets the needs of the prior art. The present invention provides related methods and a flange leveling system for supporting and aligning a pipe flange relative to another flange or a tubular member, such as a joint of a pipe in the vicinity of the pipe flange which is to be fastened, such as, for example, by welding. elated. and a process for leveling a flange for welding purposes and which process incorporates the flange leveling system of the invention. The present invention results in the flange leveling system of the invention supporting a level device and aligning the pipe flange.

In the invention, the pipe flange has a circular flange with a first side and a second side, a first plurality of angularly spaced-apart first bolt holes defined in the first side of the pipe flange, a second plurality of angularly spaced-apart second bolt holes defined in the second side of the pipe flange, the first and second plurality of bolt holes being arranged on the pipe flange so that a number of the first plurality of angularly spaced-apart first bolt holes are associated with and correspond to the second plurality of angularly spaced apart second bolt holes.

The flange leveling system comprises a first leveling unit and a second leveling unit. The first leveling unit has a U-shaped spring-loaded wire with a first leg with a distal end and a proximal end and a second leg with a distal end and a proximal end. A spring connects the proximal end of the first leg to the proximal end of the second leg. The spring acts to bias the first leg and the second leg of the first leveling unit such that the distal end of the first leg and the distal end of the second leg are biased toward each other. A stainless-steel spherical ball bearing is attached to the distal end of the first leg and to the distal end of the second leg. The ball bearing of the first leg and the ball bearing of the second leg are axially co-linear relative to each other and are sized to be seated in the first plurality of angularly spaced-apart bolt holes defined in the first side of the pipe flange to mount the first leveling unit on the first side of the pipe flange.

The second leveling unit has a U-shaped spring-loaded wire with a first leg with a distal end and a proximal end and a second leg with a distal end and a proximal end. A spring connects the proximal end of the first leg to the proximal end of the second leg and the spring acts to bias the first leg and the second leg of the second leveling unit such that the distal end of the first leg and the distal end of the second leg are biased toward each other. A stainless-steel spherical ball bearing is attached to the distal end of the first leg and to the distal end of the second leg. The ball bearing of the first leg and the ball bearing of the second leg are axially co-linear relative to each other and are sized to be seated in the second plurality of angularly spaced-apart bolt holes defined in the second side of the pipe flange to mount the second leveling unit on the second side of the pipe flange.

Related methods are also disclosed. In the invention, two stainless steel ball bearings are welded to a spring-loaded stainless steel wire ($3/16''$) such that a fitter in the field is able to level a flange for welding while the spring-loaded wire holds a torpedo level in place.

The ball bearings are less prone to damage and/or distortion discussed compared to the flange pins of the prior art and the spherical shape of the ball bearings tend to prevent dings and the like in either the ball bearings or in the flange holes. Furthermore, the spherical shape of the ball bearings of the present invention causes the level to rest on a minute point on the surface of the ball bearing so that distortion of either the ball bearings or the level is lessened, if not eliminated. The ball bearings are shaped such that they fit snugly into the flange holes.

Still further, the ball bearings of the leveling units of the invention are relatively easy to position within the flange holes such that a fitter, even if wearing heavy gloves and/or is working in difficult conditions, can easily, safely, and quickly position and remove the ball bearings of the leveling units of the present invention.

These and other features and advantages of the present invention will be better appreciated and understood when the following description is read in light of the accompanying drawings.

BRIEF DESCRIPTION OF THE DRAWING

The components in the figure are not necessarily to scale, emphasis instead being placed upon illustrating the principles of the invention.

DETAILED DESCRIPTION OF THE INVENTION

Embodiments of the invention generally relate to methods and a leveling system for supporting and aligning a flange relative to another object where the flange is to be secured. Some embodiments described herein relate to supporting and alignment of pipe flanges utilized in piping systems relative to pipe sections where the flange is to be secured. Embodiments of the leveling system include a flange support and alignment device that facilitates coaxial and/or concentric alignment of pipe flanges to the pipe sections. Embodiments of the invention may be utilized with pipe flanges including bolt-type flanges in the form of a plate or annular ring having a plurality of bolt holes formed in a pattern near an edge of the plate or ring. The bolt-type flanges include weld-neck flanges, raised face flanges, backup flanges, blind flanges, slip-on flanges, la joint flanges, socket welding flanges, threaded flanges, and the like.

Figure 1:
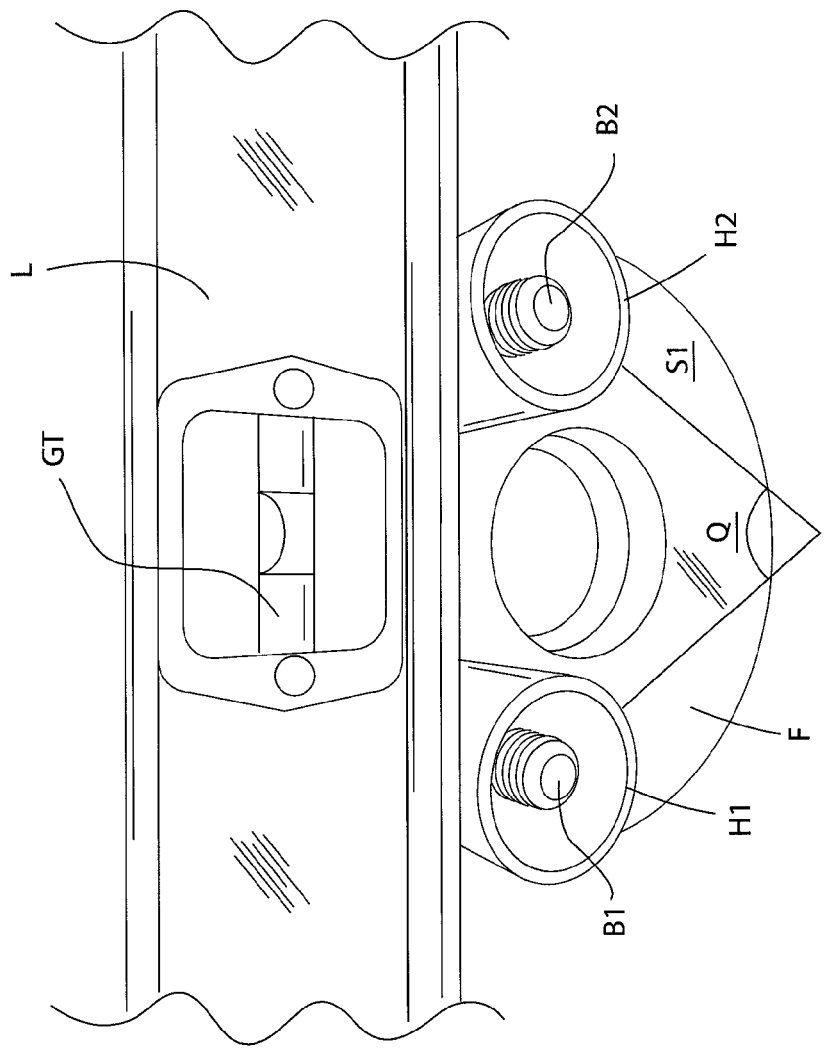
FIG. 1 is a fragmentary front elevational view of a leveling system of the prior art which supports and aligns a pipe flange.
Figure 2:
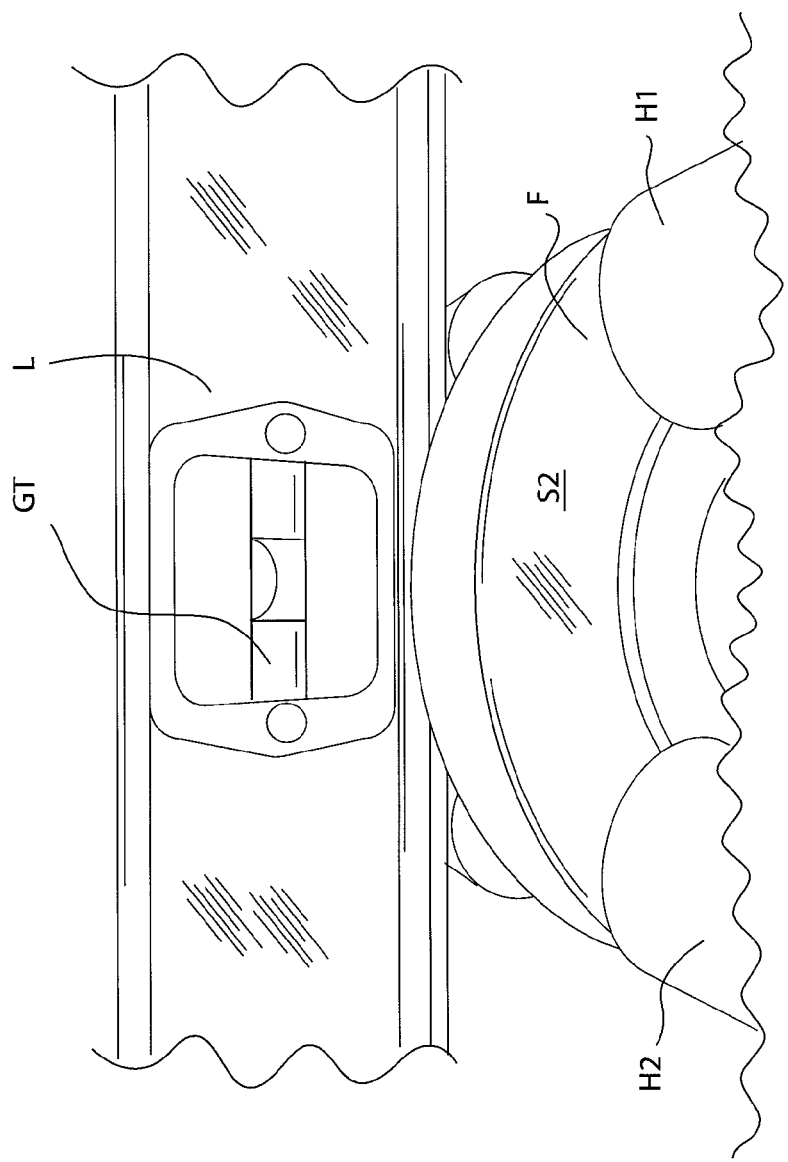
FIG. 2 is a fragmentary rear elevational view of the leveling system of the prior art of FIG. 1.

A flange leveling system of the prior art is illustrated in FIGS. 1 and 2. In the prior art, a circular flange F has opposed sides S1 (FIG. 1) and S2 (FIG. 2), each of which includes a plurality of flange bolt holes, such as flange bolt holes H1 and H2, which are angularly spaced apart from each other by an angle θ shown in FIG. 1. Each opposed side S1 and S2 of flange F has a plurality of angularly spaced-apart bolt holes, such as those indicated by reference number H1 and H2 in FIGS. 1 and 2. As understood by those skilled in the art, some flange bolt holes H1 correspond to some flange bolt holes 112. When mounting the flange F, flange bolts B1 and B2 (FIG. 1) are mounted on flange F in the flange bolt holes H1 and H2. The flange bolts B1 and B2 (FIG. 1) extend through the flange F. A level device L is placed on the flange bolts B1 and B2 which are located on one side of the flange F and the flange F is adjusted until the level L indicates a level condition (FIG. 1). The level L is then moved to the other side of the flange F (FIG. 2) and is mounted on the flange bolts B1 and B2, and the flange F is adjusted until the level L indicates a level condition for that side of the flange F (FIG. 2). As discussed herein above, this leveling system of the prior art is prone to errors for many reasons and is often cumbersome. The leveling system of the present invention is designed to overcome one or more of the difficulties presented in the prior art.

As is commonly known, a level, such as that indicated by reference number L in the figures, is a device for establishing a horizontal plane. This device generally consists of a small glass tube GT containing alcohol or similar liquid and an air bubble. The tube is sealed and fixed horizontally in a wooden or metallic block or frame with a smooth lower surface. The glass tube is slightly bowed, and adjustment to the horizontal is indicated by movement of the bubble. The device L is on a level surface when the bubble is in the middle of the glass tube.

Figure 3:
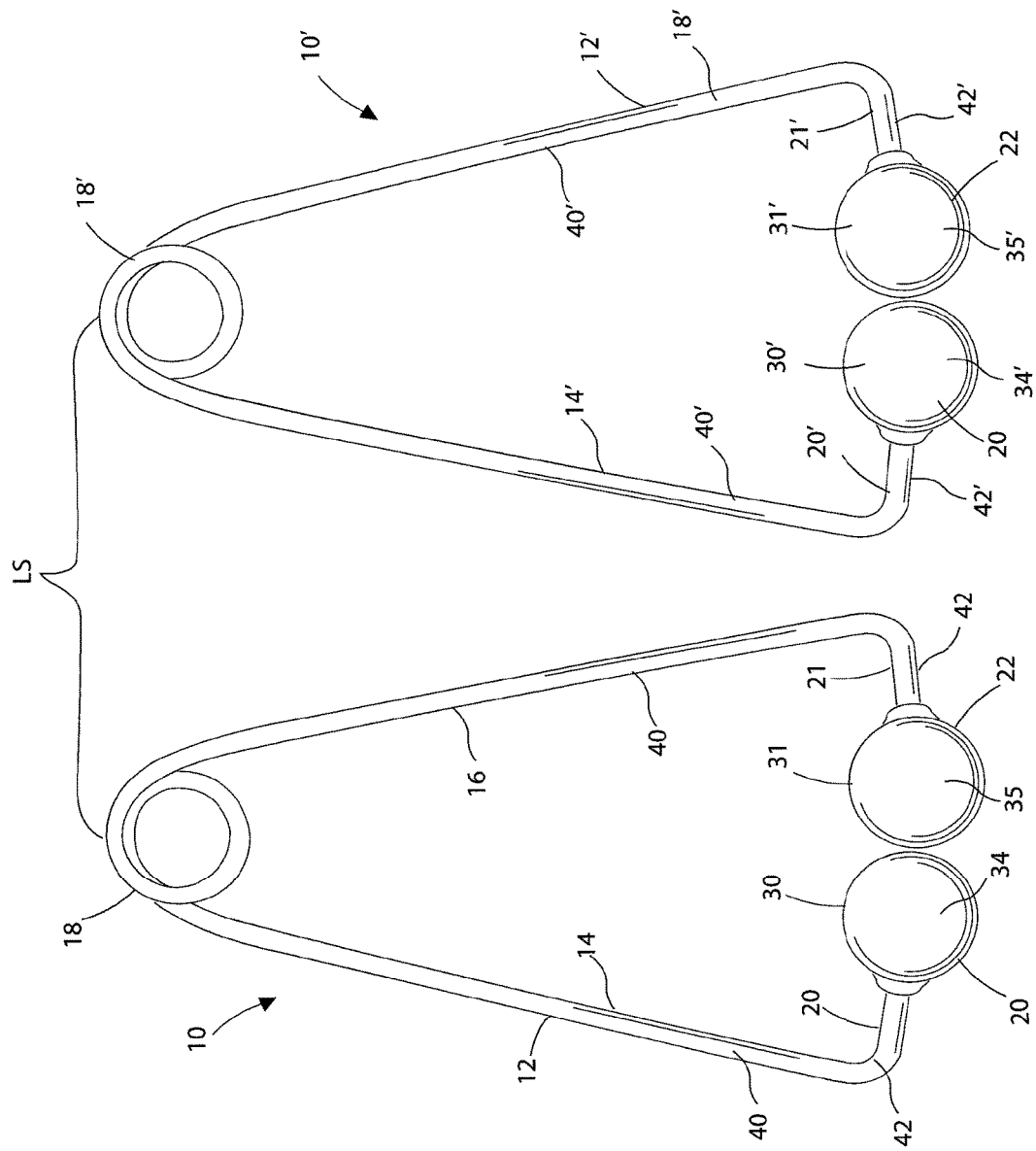
FIG. 3 is an elevational view illustrating a leveling system for supporting and aligning a pipe flange of the present invention in an inoperative condition.
Figure 4:
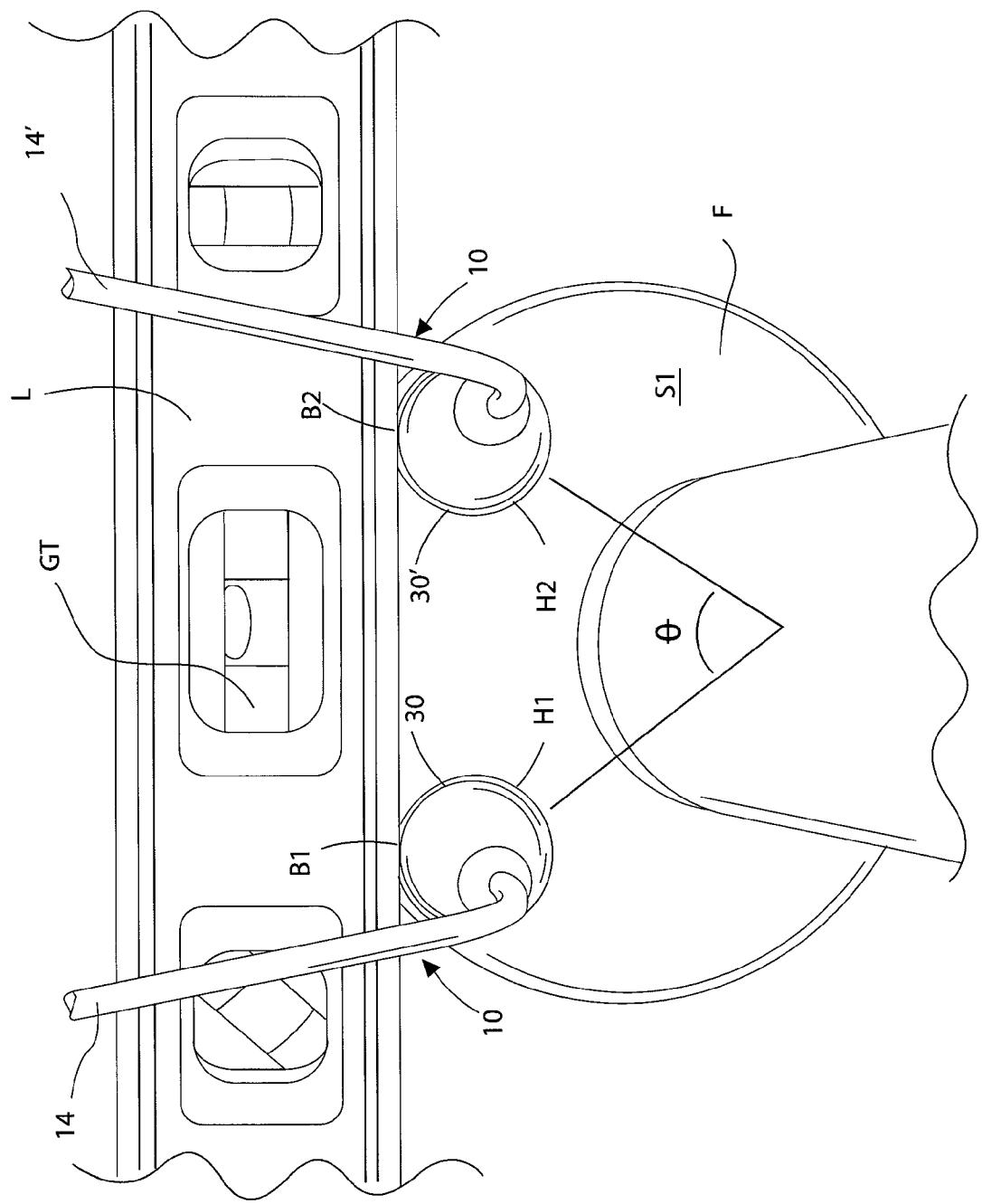
FIG. 4 is a partial front elevational view of the leveling system of the present invention being used in conjunction with a pipe flange.
Figure 5:
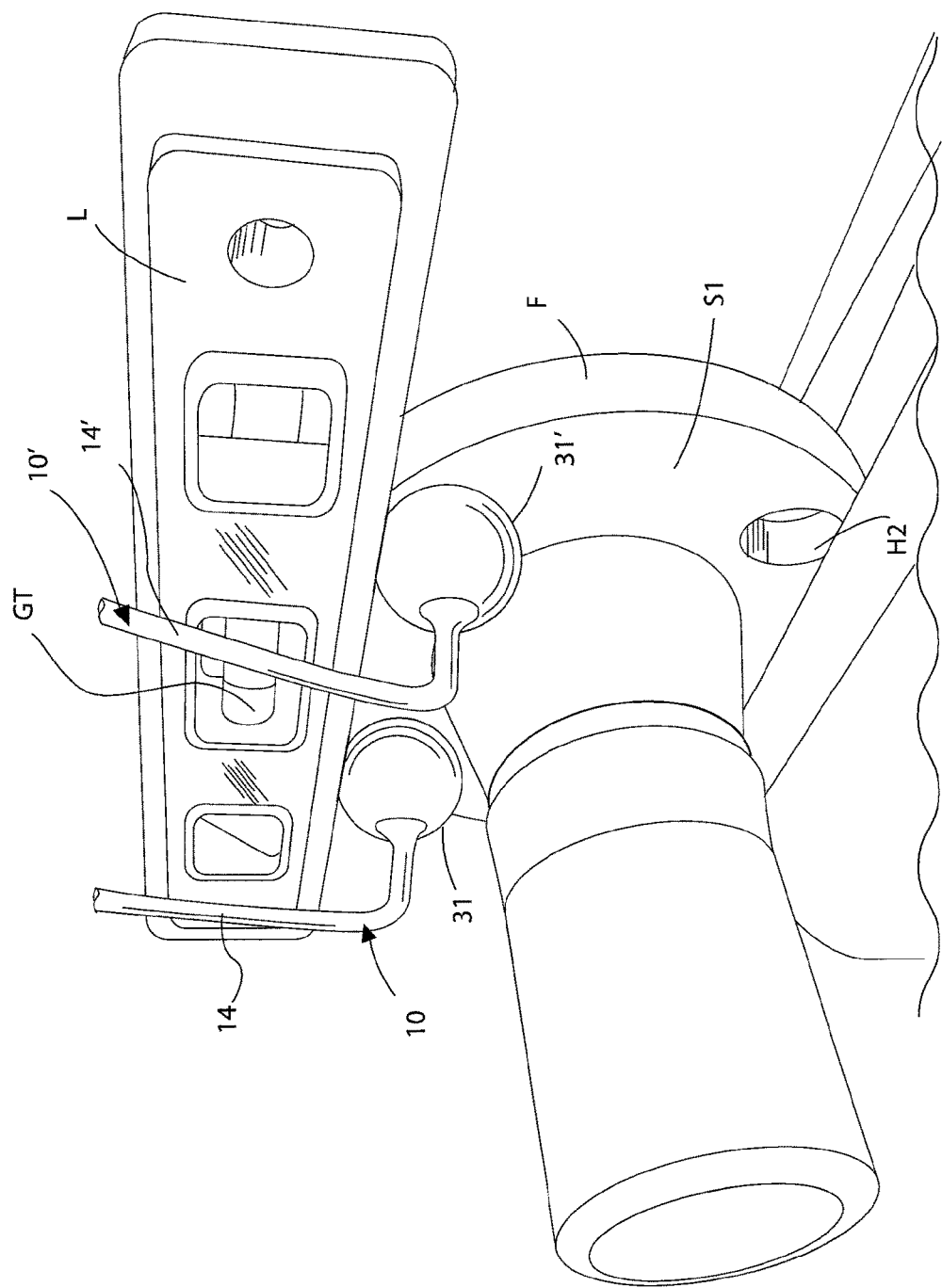
FIG. 5 is a partial side perspective view of the leveling system of the present invention being used in conjunction with a pipe flange.
Figure 6:
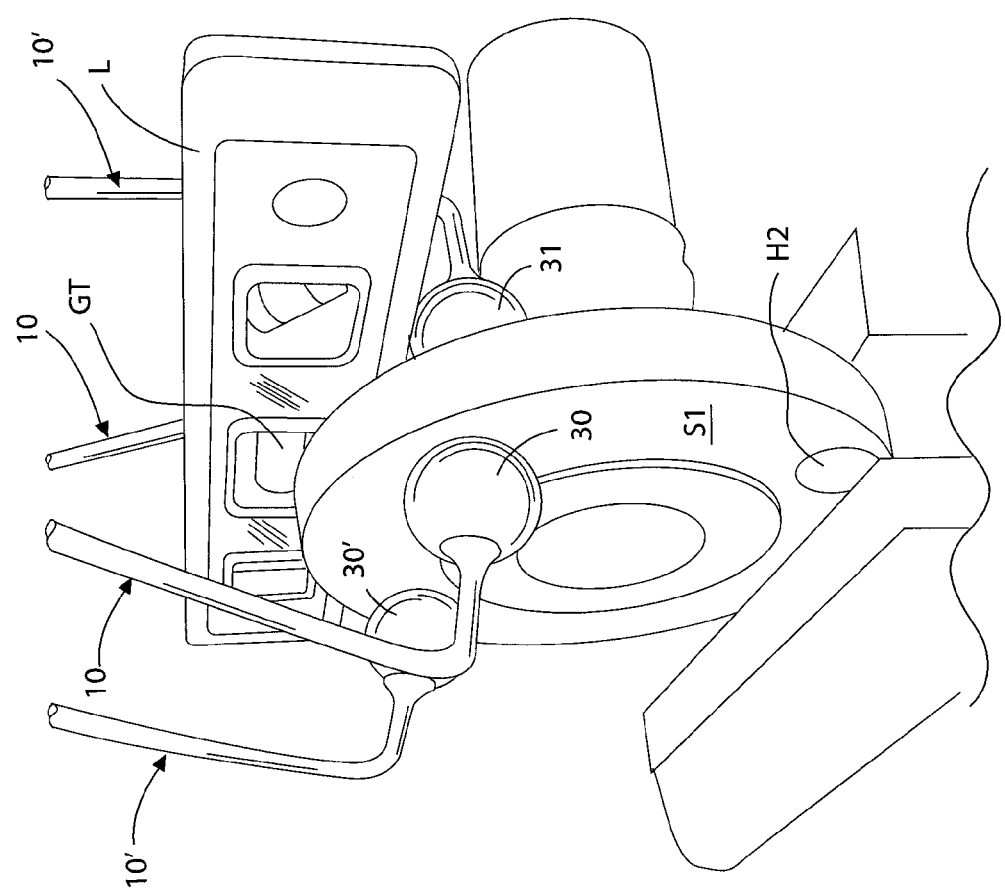
FIG. 6 is a partial rear perspective view of the leveling system of the present invention used in conjunction with a pipe flange.

Referring now to the invention, reference is made to FIG. 3 through FIG. 6. It is to be appreciated that the present invention is embodied in a flange leveling system LS (FIG. 3) for supporting and aligning a pipe flange. With particular reference to FIGS. 4, 5 and 6, a circular flange F includes a plurality of flange bolt holes, such as flange bolt holes H1 and H2, which are angularly spaced apart from each other by an angle θ, as particularly illustrated in FIG. 4. Flange F includes opposed sides S1 and S2, with each side S1, S2 having a plurality of angularly spaced-apart flange bolt holes. As can be understood by one skilled in the art, some of the flange holes H1 correspond to some of the flange holes H2. When mounting flange F, flange bolts, such as those indicated by reference numbers B1 and B2, are mounted in the bolt holes H1 and H2 in flange F and extend through flange F.

Referring again to FIG. 3, the flange leveling system LS of the invention is comprised of two leveling units 10 and 10' which act to expeditiously install a flange F. Each leveling unit 10, 10' includes a U-shaped spring wire 12, 12' having a first leg 14, 14' and a second leg 16, 16' which are connected together by a spring 18, 18'. Spring 18, 18' is circular in shape and is located adjacent to a proximal end 19, 19' of each first leg 14, 14' and to a proximal end 19a, 19a' of each second leg 16, 16' of leveling units 10, 10'. Each first leg 14, 14' also has a distal end 20, 20', respectively, and each second leg 16, 16' has a distal end 21, 21', respectively.

Still referring to FIGS. 3 through 6, and more particularly to FIG. 3, each leveling unit 10, 10' further includes a first ball bearing 30, 30' and a second ball bearing 31, 31'. The first ball bearing 30, 30' of each leveling unit 10, 10' is located at the distal end 20, 20' of the first leg 14, 14' and the second ball bearing 31, 31' of the leveling units 10, 10' is located at the distal end 21, 21' of the second leg 16, 16'. Ball bearings 30, 30', 31, and 31' may be made of stainless steel or other appropriate materials.

Referring particularly to FIG. 3, each ball bearing 30, 30', 31, and 31' is spherical and has a central axis 34, 35 and 34', 35' with the first ball bearings 30, 31 and the second ball bearings 30', 31' on the legs being axially co-linear with each other. In a preferred embodiment of the leveling system S of the invention, each first leg 14, 14' and second leg 16, 16' of each leveling unit 10, 10' is L-shaped and includes a first section 40, 40' extending from the proximal end and a second section 42, 42' located adjacent to the distal end 20, 20' of the first leg and the distal end 21, 21' of the second leg. Second sections 42 and 42' are shorter than the first sections 40 and 40' and are co-linear with each other and with the central axis 34, 35 of ball bearings 30, 31 of the first leveling unit 10 and with the central axis 34', 35' of ball bearings 30', 31' of the second leveling unit 10'.

The first ball bearings and the second ball bearings on the first and second legs respectively of each leveling unit 10, 10' are accommodated in an associated flange bolt hole H1 or H2 located in the first side S1 and second side S2 of flange F in order to mount each leveling unit 10, 10' onto the flange F. That is, in operation, the two leveling units 10, 10' are used to level flange F, more about which is described herein below.

Still referring particularly to FIG. 3, spring 18 of leveling unit 10 is used to bias legs 14 and 16 toward each other, and spring 18' of leveling unit 10' is used to bias legs 14', 16' toward each other. This results, in turn, of the biasing of ball bearings 30, 31 and 30', 31' of each leveling unit 10, 10' toward each other so that the legs of each leveling unit are first forced apart to position the ball bearings on either side of the flange, and then biasing of the spring 18, 18' will seat the ball bearings in the flange holes on each side of the flange when the legs are released.

Using the leveling units 10, 10' of the present invention enables a workman or a fitter to level a flange F for welding much faster and easier while the U-shaped wire 12, 12' holds a torpedo level L in place. With particular reference to FIGS. 4, 5, and 6, each leveling unit 10, 10' is positioned relative to flange F in a similar manner. The methods for leveling a flange F for welding purposes incorporates the leveling units 10, 10' of the present invention. Such methods comprise the following steps:
  a) positioning the first leveling unit 10 on the flange F by flexing wire 12 to move legs 14, 16 apart against the bias of spring 18 thereby moving ball bearings 30, 31 away from each other;
  b) locating ball bearings 30, 31 of first leveling unit 10 on opposite sides S1, S2 of the flange F and adjacent to the first flange hole and the flange hole which are associated with each other;
  c) releasing the spring-loaded wire 12 of the first leveling unit 10 and allowing the bias of the spring-loaded wire to seat the first ball bearing of the first leveling unit 10 in the first flange hole on the first side of the flange and the second ball bearing of the first leveling unit 10 in the second flange hole on the second side of the flange which is associated with the first flange hole having the first ball bearing of the first leveling unit seated therein;
  d) repeating the process of steps a), b) and c) using the second leveling unit 10' to seat the first ball bearing of the second leveling unit 10' in a first flange hole that is angularly spaced away from the first flange hole having the first ball bearing of the first leveling unit seated therein and to seat second ball bearing of the second leveling unit in a second flange hole that is angularly spaced away from the second flange hole having the second ball bearing of the first leveling unit seated therein;

e) resting a torpedo level, such as level L, on the seated ball bearings on each side of the flange; and f) adjusting the flange until the flange holes having the ball bearings seated therein are level with each other.

The above steps result a pipe flange F being supported and aligned relative to another flange or to a tubular member, such as a joint of a pipe in the vicinity of the pipe flange which is to be fastened, such as, for example, by welding.

FIGS. 4, 5, and 6 illustrate the manner in which the leveling units 10, 10' of the system S of the present invention supports a level L. That is, level L rests on the spherical surfaces of flange ball bearings 30, 30', 31, 31'. This resting process is quite accurate since their spherical surfaces of the flange balls are extremely precise and not subject to the same damage and/or distortion such as that of the flange pins of the prior art.

The leveling units 10, 10' of the leveling system LS of the present invention are easy to store, easy to carry, easy to install, and easy to remove while remaining substantially accurate and precise each time the leveling units 10, 10' are used. In the invention, a flange is easily leveled for welding by using the two leveling units 10, 10' such that a fitter is able to level the flange for welding much faster and easier while the U-shaped spring-loaded wire 12, 12' holds the level L in place. The spring-loaded wire 12, 12' may be made of stainless steel or other suitable material and be 3/16-inch wire. The ball bearings 30, 31, 30', and 31' may be made of stainless steel or other suitable material and connected to the spring-loaded wire 12, 12' through a welding process or other suitable process.

While the present invention has been described in connection with a preferred embodiment of the figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:

1. A flange leveling system for supporting and aligning a pipe flange, the pipe flange having a circular flange with a first side and a second side, a first plurality of angularly spaced-apart first bolt holes defined in the first side of the pipe flange, a second plurality of angularly spaced-apart second bolt holes defined in the second side of the pipe flange, the first and second plurality of bolt holes being arranged on the pipe flange so that a number of the first plurality of angularly spaced-apart first bolt holes are associated with and correspond to the second plurality of angularly spaced apart second bolt holes, the flange leveling system comprising:

a first leveling unit comprising a U-shaped spring-loaded wire having a first leg with a distal end and a proximal end and a second leg with a distal end and a proximal end, and a spring connecting the proximal end of the first leg to the proximal end of the second leg, and the spring acting to bias the first leg and the second leg of the first leveling unit such that the distal end of the first leg and the distal end of the second leg are biased toward each other, and a stainless steel spherical ball bearing attached to the distal end of the first leg and to the distal end of the second leg, the ball bearing of the first leg and the ball bearing of the second leg being axially co-linear relative to each other and being sized to be seated in the first plurality of angularly spaced-apart bolt holes defined in the first side of the pipe flange to mount the first leveling unit on the first side of the pipe flange.

2. The flange leveling system of claim 1, further comprising:

a second leveling unit comprising a U-shaped spring-loaded wire having a first leg with a distal end and a proximal end and a second leg with a distal end and a proximal end, and a spring connecting the proximal end of the first leg to the proximal end of the second leg and the spring acting to bias the first leg and the second leg of the second leveling unit such that the distal end of the first leg and the distal end of the second leg are biased toward each other, and a stainless steel spherical ball bearing attached to the distal end of the first leg and to the distal end of the second leg, the ball bearing of the first leg and the ball bearing of the second leg being axially co-linear relative to each other and being sized to be seated in the second plurality of angularly spaced-apart bolt holes defined in the second side of the pipe flange to mount the second leveling unit on the second side of the pipe flange.

3. The flange leveling system of claim 2, wherein the first leg and the second leg of the first leveling unit and the second leveling unit are L-shaped and includes a first section extending from the proximal end and a second section located adjacent to the distal end of the first leg and the distal end of the second leg, and wherein the second sections are shorter than the first sections and are co-linear relative to each other and the central axis of the ball bearings of the first leveling unit and the second leveling unit.

4. A process for supporting and aligning a pipe flange having first and second sides, a plurality of first angularly spaced-apart first bolt holes defined in the flange first side, a plurality of second angularly spaced-apart second bolt holes defined in the flange second side, the first and second plurality of bolt holes being arranged on the flange so that some of the plurality of first bolt holes are associated with corresponding second bolt holes of the plurality of second bolt holes; the steps comprising:

providing a first leveling unit and a second leveling unit, each leveling unit including a U-shaped spring-loaded wire having first and second legs, each leg having a distal end and a proximal end, a spring connecting the proximal ends of the first and second legs of each leveling unit together, the spring biasing the legs of each leveling unit so that the distal ends of the first and second legs of each leveling unit are biased toward each other, a stainless steel ball bearing on the distal end of each of the first and second legs of each leveling unit, each ball bearing being spherical in shape and having a central axis, the ball bearings on the first and second legs of each leveling unit being axially co-linear relative to each other and being sized to be seated in the bolt holes defined in the flange, the spherical ball bearings on the first and second legs respectively of each leveling unit being accommodated in associated flange bolt holes in the first and second sides of the flange respectively to mount each leveling unit on the flange;

positioning the first leveling unit on the flange by a process which includes the steps of flexing the first and second legs of the first leveling unit away from each other against the bias of the spring on the first leveling unit; moving the ball bearings of the first leveling unit apart from each other; locating the ball bearings of the first leveling unit on the opposite sides of the flange; positioning the first ball bearing of the first leveling unit in one of the plurality of first flange holes on the first side of the flange; positioning the second ball bearing of the first leveling unit in a corresponding second hole on the second side of the flange; releasing the first and second legs of the first leveling unit to seat the first ball bearing of the first leveling unit in the flange hole on the first side of the flange and the second ball bearing of the first leveling unit in the associated second flange hole on the second side of the flange;

positioning the second leveling unit on the flange by a process which includes the steps of flexing the first and second legs of the second leveling unit away from each other against the bias of the spring on the second leveling unit; moving the ball bearings of the second leveling unit apart from each other; locating the ball bearings of the second leveling unit on the opposite sides of the flange; positioning the first ball bearing of the second leveling unit in a first flange hole that is angularly spaced-apart from the first flange hole having the first ball bearing of the first leveling unit seated therein; positioning the second ball bearing of the second leveling unit in a corresponding second hole which is angularly spaced-apart from the second flange hole having the second ball bearing of the first leveling unit seated therein; releasing the first and second legs of the second leveling unit to seat the first ball bearing of the second leveling unit in the flange hole on the first side of the flange at which the first ball bearing is positioned and the second ball bearing of the second leveling unit in the associated second flange hole on the second side of the flange at which the second ball bearing of the second leveling unit is positioned;

resting a torpedo level on the seated ball bearings on the first side of the flange;

resting the torpedo level on the seated ball bearings on the second side of the flange; and adjusting the flange until the associated flange holes on the first and second sides of the flange are level with each other.

5. A process for leveling a flange, the steps comprising:

providing a circular flange having first and second sides and having a plurality of angularly spaced-apart first bolt holes defined in the first side and a plurality of angularly spaced-apart second bolt holes defined in the second side, the first and second plurality of bolt holes being arranged on the flange so that some of the plurality of first bolt holes are associated with corresponding second bolt holes of the plurality of second bolt holes;

providing first and second leveling units for installing the flange, each leveling unit including a U-shaped spring-loaded wire having first and second legs, each leg having a distal end and a proximal end, a spring connecting the proximal ends of the first and second legs of each leveling unit together, the spring biasing the legs of each leveling unit so that the distal ends of the first and second legs of each leveling unit are biased toward each other, a ball bearing on the distal end of each of the first and second legs of each leveling unit, each ball bearing being spherical in shape and having a central axis, the ball bearings on the first and second legs of each leveling unit being axially co-linear with each other and being sized to be seated in the bolt holes defined in the flange, the spherical ball bearings on the first and second legs respectively of each leveling unit being accommodated in associated flange bolt holes in the first and second sides of the flange respectively to mount each leveling unit on the flange; the steps comprising:

positioning the first leveling unit on the flange by a process which includes the steps of seating the first ball bearing of the first leveling unit in the first flange hole on the first side of the flange and seating the second ball bearing of the first leveling unit in the second flange hole on the second side of the flange which is associated with the first flange hole in which the first ball bearing of the first leveling unit is positioned;

positioning the second leveling unit on the flange by a process which includes steps of seating the first ball bearing of the second leveling unit in the first flange hole that is angularly spaced-apart from the first flange hole having the first ball bearing of the first leveling unit seated therein, seating the second ball bearing of the second leveling unit in the second flange hole on the second side of the flange which is associated with the first flange hole in which the first ball bearing of the second leveling unit is positioned;

resting a level on the seated ball bearings on the first side of the flange;

resting the level on the seated ball bearings on the second side of the flange; and adjusting the flange until the associated flange holes on the first and second sides of the flange are level with each other.

* * * * *